United States Patent
Fricke et al.

(10) Patent No.: US 11,455,853 B2
(45) Date of Patent: Sep. 27, 2022

(54) METHOD FOR CALIBRATING A RADIO-BASED KEYLESS ACCESS SYSTEM OF A MOTOR VEHICLE, ACCESS SYSTEM, AND MOTOR VEHICLE

(71) Applicant: VOLKSWAGEN AKTIENGESELLSCHAFT, Wolfsburg (DE)

(72) Inventors: Christoph Fricke, Braunschweig (DE); Andreas Thiele, Wolfsburg (DE); Dominique Nemetschek, Velpke (DE)

(73) Assignee: Volkswagen Aktiengesellschaft

( * ) Notice: Subject to any disclaimer, the term of this patent is extended or adjusted under 35 U.S.C. 154(b) by 143 days.

(21) Appl. No.: 17/254,629

(22) PCT Filed: May 21, 2019

(86) PCT No.: PCT/EP2019/063077
§ 371 (c)(1),
(2) Date: Dec. 21, 2020

(87) PCT Pub. No.: WO2019/242965
PCT Pub. Date: Dec. 26, 2019

(65) Prior Publication Data
US 2021/0150836 A1 May 20, 2021

(30) Foreign Application Priority Data
Jun. 21, 2018 (DE) ............ 10 2018 210 072.1

(51) Int. Cl.
*G07C 9/00* (2020.01)
*B60R 25/24* (2013.01)

(52) U.S. Cl.
CPC ........ *G07C 9/00309* (2013.01); *B60R 25/245* (2013.01); *G07C 2009/00333* (2013.01); *G07C 2209/61* (2013.01); *G07C 2209/63* (2013.01)

(58) Field of Classification Search
CPC ........ B60R 25/245; G07C 2009/00333; G07C 2209/61; G07C 2209/63; G07C 9/00309
See application file for complete search history.

(56) References Cited

U.S. PATENT DOCUMENTS

| 8,461,974 B2 | 6/2013 | Emmerling et al. |
| 8,587,403 B2 * | 11/2013 | Ghabra ............. G07C 9/00309 340/426.36 |

(Continued)

FOREIGN PATENT DOCUMENTS

| CN | 102529884 A | 7/2012 |
| CN | 103217662 A | 7/2013 |

(Continued)

OTHER PUBLICATIONS

Search Report for International Patent Application No. PCT/EP2019/063077; dated Jul. 18, 2019.

(Continued)

*Primary Examiner* — Sisay Yacob
(74) *Attorney, Agent, or Firm* — Barnes & Thornburg, LLP

(57) ABSTRACT

A method for calibrating a radio-based keyless access system of a transportation vehicle, an access system, and a corresponding transportation vehicle. Based on a measured field strength of an LF field, it is determined whether the signal transmitter is located at most at a specified distance from the transportation vehicle. A second transmission device emits a higher-frequency calibration signal in response to which the signal transmitter transmits a response signal back to the transportation vehicle. A reference distance from the signal transmitter to the transportation vehicle is automatically determined from the propagation time of the calibration signal and the response signal. The measured LF field strength-based determination of whether the signal transmitter is located at most at a specified (Continued)

distance from the transportation vehicle is then calibrated automatically based on the determined reference distance.

17 Claims, 1 Drawing Sheet

(56) References Cited

U.S. PATENT DOCUMENTS

| | | | |
|---|---|---|---|
| 8,706,350 | B2 | 4/2014 | Talty et al. |
| 9,554,286 | B2 | 1/2017 | Ghabra et al. |
| 9,894,613 | B2 | 2/2018 | Scheim et al. |
| 10,163,286 | B2 | 12/2018 | Gennermann |
| 2002/0160720 | A1* | 10/2002 | Meradi .............. H01Q 1/3241 455/67.14 |
| 2005/0038574 | A1 | 2/2005 | Gila et al. |
| 2010/0321154 | A1* | 12/2010 | Ghabra .............. B60R 25/00 340/5.61 |
| 2015/0235488 | A1* | 8/2015 | Proefke .............. G07C 9/20 340/5.61 |
| 2015/0379859 | A1 | 12/2015 | Nespolo |
| 2016/0267734 | A1 | 9/2016 | Hamada et al. |
| 2017/0026910 | A1 | 1/2017 | Scheim et al. |

FOREIGN PATENT DOCUMENTS

| | | |
|---|---|---|
| CN | 103229215 A | 7/2013 |
| CN | 106373219 A | 2/2017 |
| CN | 106794822 A | 5/2017 |
| DE | 10212648 A1 | 10/2003 |
| DE | 102004036920 A1 | 3/2005 |
| DE | 102004042231 A1 | 3/2006 |
| DE | 102005058041 A1 | 6/2007 |
| DE | 102006008141 A1 | 8/2007 |
| DE | 102008012882 A1 | 9/2009 |
| DE | 102015109275 A1 | 12/2015 |
| DE | 102014226925 A1 | 6/2016 |
| DE | 102016113320 A1 | 1/2017 |
| DE | 112014006819 T5 | 3/2017 |
| DE | 102015226150 A1 | 6/2017 |
| JP | 2016139840 A | 8/2016 |
| WO | 2016059451 A1 | 4/2016 |
| WO | WO-2016059451 A1 * | 4/2016 .............. B60R 25/24 |

OTHER PUBLICATIONS

Office Action for Chinese Patent Application No. 201980054273.5; dated Jun. 20, 2022.

* cited by examiner

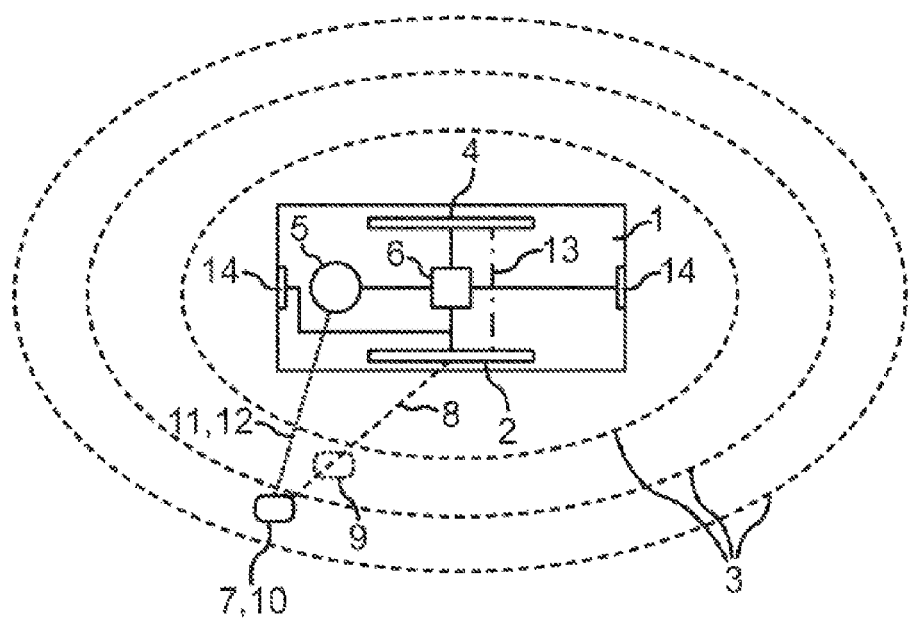

METHOD FOR CALIBRATING A RADIO-BASED KEYLESS ACCESS SYSTEM OF A MOTOR VEHICLE, ACCESS SYSTEM, AND MOTOR VEHICLE

PRIORITY CLAIM

This patent application is a U.S. National Phase of International Patent Application No. PCT/EP2019/063077, filed 21 May 2019, which claims priority to German Patent Application No. 10 2018 210 072.1, filed 21 Jun. 2018, the disclosures of which are incorporated herein by reference in their entireties.

SUMMARY

Illustrative embodiments relate to a method for calibrating a radio-based keyless access system of a transportation vehicle, to a corresponding radio-based keyless access system, and to a transportation vehicle comprising such an access system.

BRIEF DESCRIPTION OF THE DRAWINGS

The disclosed embodiments will be described in more detail below with reference to the FIGURE, in which:

FIG. 1 shows a schematic overview illustration for elucidating a method for calibrating a radio-based keyless access system of a transportation vehicle.

DETAILED DESCRIPTION

Radio-based keyless access systems for transportation vehicles are already known per se. Such systems enable a user, for example, to unlock a transportation vehicle automatically when a signal transmitter or identification transmitter (ID transmitter) carried by the user is brought into the vicinity of the transportation vehicle. Although the signal transmitter can be integrated into a key for the transportation vehicle, the term "keyless" within the meaning of the present disclosure refers to the fact that the user does not have to actuate the key or the signal transmitter manually to unlock the transportation vehicle. In the corresponding technical field, such access systems are also referred to as keyless access system or Kessy system for short. These access systems are intended to provide or implement a respective functionality, that is to say, for instance, the automatic unlocking of the transportation vehicle, at a predefined distance from the transportation vehicle. In a practical application, however, the problem may be observed that the respective functionality is actually initiated or implemented at different distances from the transportation vehicle depending on the environment. This is undesirable for safety reasons and with regard to a desired consistency or predictability of a behavior of the access system.

DE 10 2015 226 150 A1 already discloses a method for calibrating a radio device for a transportation vehicle locking system comprising a plurality of antennas. In that case, first signals are transmitted by a first antenna provided at a first location of the transportation vehicle and are received by the first antenna and/or a second antenna of the transportation vehicle. Second signals are emitted by a second antenna provided at a second location of the transportation vehicle and are received by a plurality of the antennas. Data of a radio environment model with respect to the transportation vehicle are formed on the basis of received values for the first and second signals.

DE 10 2008 012 882 A1 describes an electrical circuit for access control and for an immobilizer of a transportation vehicle. In that case, a first antenna is provided for transmitting a signal in the case of the identification of an ID transmitter for the access control of the transportation vehicle. Furthermore, a second antenna is provided for emitting a signal in the case of the identification of an ID transmitter for the immobilizer of the transportation vehicle. A receiver device is provided for receiving a signal received from an antenna for the identification of an ID transmitter for the immobilizer. In that case, a first antenna driver for driving the first antenna and the receiver device are jointly integrated in a semiconductor chip.

US 2017/0 026 910 A1 relates to a passive access and start system for a transportation vehicle. Said system comprises a portable device having a transceiver, a transportation vehicle-based transceiver and a control device. The transportation vehicle-based transceiver emits an interrogation signal, in response to which the transceiver of the portable device transmits a response signal. The control device determines a distance of the portable device relative to the transportation vehicle-based transceiver as a function of a time of flight of the interrogation and response signals. The control device controls a measurement duty cycle of the interrogation signal according to the distance determined. In that case, a higher duty cycle can be used, the closer to the transportation vehicle the portable device is situated.

DE 10 2006 008 141 presents a method for operating a radio-based identification system with a central unit and at least one identification transmitter. The central unit generates an electric field with first identification information, which is detected by the identification transmitter, the latter generating second identification information and transmitting it to the central unit. In that case, a time period, relative to the emission of the first identification information, is predefined with regard to duration and position and the second identification information is accepted only within this predefined time period. In that case, the time period may be variable and is varied during operation.

DE 10 2015 109 275 A1 relates to a passive access system for a transportation vehicle, wherein the distance between transportation vehicle key and transportation vehicle is determined. The document proposes carrying out a distance measurement by evaluation of the received signal strength indicator (RSSI), the time of arrival (TOA) and/or the angle of arrival (AOA).

DE 102 12 648 A1 relates to an identification system for verifying authorization for access to a transportation vehicle. In that case, the distance between the transportation vehicle key and the transportation vehicle is determined by measuring the signal time-of-flight of the response signal or the time of flight of the signals between the emission of the interrogation signal and the reception of the response signal. This can be done by way of time measurement or by way of phase measurement.

DE 10 2005 058 041 A1 discloses a method for operating an access protection system for a transportation vehicle. In that case, the transportation vehicle transmits a signal to the transportation vehicle key. The transportation vehicle key forms a second signal, into which information about the received strength is inserted, and transmits the second signal back to the transportation vehicle via the wireless connection. The received strength of the first signal is related to the received strength of the second signal and access authorization is ascertained if the two received strengths differ by less than a predefined value.

DE 10 2016 113 320 A1 discloses a method for a radio-based keyless access system for a transportation vehicle, wherein an LF field is emitted into an environment of the transportation vehicle by a first transmitting device of the transportation vehicle, and on the basis of a field strength of the LF field measured by a signal transmitter separate from the transportation vehicle, the fact of whether the signal transmitter is situated at most at a predefined distance from the transportation vehicle is determined automatically.

The disclosed embodiments improve an accuracy of a keyless access system of a transportation vehicle.

A disclosed method serves for calibrating a radio-based keyless access system of a transportation vehicle. In this case, an LF field is emitted into an environment of the transportation vehicle by a first transmitting device of the transportation vehicle. In this case, the LF field is an electromagnetic field having a frequency from the LF band (LF: "low frequency"), that is to say having a frequency from the range of 30 kHz to 300 kHz. This low-frequency LF field can be emitted with a low energy demand and therefore permanently or continuously. A signal transmitter which is separate from the transportation vehicle, and is portable, is used to measure a local field strength of the LF field at the respective location of the signal transmitter. The fact of whether the signal transmitter is situated at most at a predefined distance from the transportation vehicle is then determined automatically on the basis of this measured field strength of the LF field. Predefined standard conditions can be used for this purpose. In other words, a family of characteristic curves or a function or the like can thus be predefined and stored, for example, which describes the field strength of the LF field, the field strength decreasing with increasing distance from the transportation vehicle, under the predefined standard conditions. This process of determining, on the basis of the measured field strength of the LF field, the—assumed—distance between the signal transmitter and the transportation vehicle can be carried out by a data or signal processing device.

The data or signal processing device can be arranged in the signal transmitter itself and/or in or on the transportation vehicle. In the former case, the signal transmitter can transmit or communicate a data or control signal to the transportation vehicle to activate or initiate at least one function or functionality of the transportation vehicle or of the keyless access system. In the latter case, the signal transmitter can communicate, for example, a measurement value of the field strength measured by the signal transmitter to the transportation vehicle or the data or signal processing device arranged in the transportation vehicle, which device then determines therefrom whether the signal transmitter is situated at most at the predefined distance from the transportation vehicle. The corresponding function or functionality can thus be initiated or activated or carried out if and/or as long as the signal transmitter is not further away from the transportation vehicle than the predefined distance therefrom. Likewise, for example, the and/or a further function or functionality can be activated or initiated if the distance between the signal transmitter and the transportation vehicle that is determined in this way exceeds the predefined distance, that is to say that the signal transmitter is no longer detectable within the predefined distance with respect to the transportation vehicle. In the latter case, the transportation vehicle can be locked automatically, for example. In this way, the radio-based keyless access system thus serves for providing at least one function or functionality at the predefined distance with respect to the transportation vehicle.

In this case, the predefined distance can be dependent on the respective function or functionality. In this regard, for example, different distances can be predefined for different functions or functionalities. By way of example, provision can be made for a lighting device of the transportation vehicle to be activated automatically if the signal transmitter has approached the transportation vehicle at least up to a first predefined distance, for example, up to 6 m. If the signal transmitter has approached the transportation vehicle up to a second predefined distance, for example, up to 2 m, then a second function can be initiated, for example, unlocking of the transportation vehicle.

According to the disclosure, it is provided that if a predefined condition of the signal transmitter and/or to operation of the transportation vehicle is fulfilled, a calibration signal having a higher frequency in comparison with the LF field is emitted by a second transmitting device of the transportation vehicle. The signal transmitter receives the calibration signal and thereupon transmits back to the transportation vehicle a response signal having likewise a higher frequency in comparison with the LF field—in particular having the same frequency as the calibration signal. A reference distance between the signal transmitter and the transportation vehicle is determined automatically from a signal time-of-flight of the calibration signal and of the response signal between the emission of the calibration signal and reception of the response signal by the transportation vehicle. The transportation vehicle, for example, the second transmitting device, can thus comprise a receiving device for the response signal. In this case, the reference distance represents the actual distance between the signal transmitter and the transportation vehicle at least within the scope of the respective measurement accuracy.

The process of determining, on the basis of the measured field strength of the LF field, whether the signal transmitter is situated at most at the predefined distance from the transportation vehicle is then calibrated automatically depending on the reference distance determined on the basis of the signal time-of-flight. In other words, the distance between the signal transmitter and the transportation vehicle is thus determined in two different and independent ways, in particular using two different frequencies. In this case, the reference distance determined on the basis of the signal time-of-flight serves as a reference or target value, which the distance determination based on the measured LF field strength is also intended to yield as the result for the corresponding actual position or distance of the signal transmitter relative to the transportation vehicle. This is set, i.e., ensured, by the calibration. In this case, the distance determination based on the signal time-of-flight may be carried out if there is a direct line of sight between the transportation vehicle, in particular, the second transmitting device, and the signal transmitter, that is to say that the calibration signal and the response signal can be transferred directly, i.e., exchanged or communicated without reflections, between the transportation vehicle and the signal transmitter.

An influence which an environment of the transportation vehicle, in particular, a surface underneath the latter, can have on propagation and ultimately on the distance-dependent field strength or change in the field strength of the LF field can be taken into account automatically in this way. In this regard, by way of example, for the same transmission or output power of the first transmitting device at a specific distance from the transportation vehicle, the measured field strength of the LF field can have a higher value if the transportation vehicle is situated in a reinforced concrete structure, for example, a multi-story car park, in comparison with if the motor transportation vehicle is situated outdoors on grass, for example. This can have the effect that the assumed distance of the motor transportation vehicle determined on the basis of the measured LF field strength, that is to say the field strength of the LF field, is less than the reference distance and, in particular, less than the actual or real distance between the signal transmitter and the motor transportation vehicle. The latter can be determined with a higher accuracy on the basis of the signal time-of-flight of the calibration signal and the response signal. Accordingly, provision can be made, for example, for the corresponding function or functionality to be actually initiated only if, after the calibration or taking account of the reference distance determined, it was determined or confirmed that the signal transmitter is actually situated at most at the predefined distance from the transportation vehicle. This can hold true at least for future function initiations or determinations of the respective distance based on the respective measured field strength of the LF field, in particular, as long as the transportation vehicle is situated at the respective current position or in the respective current environment, that is to say, for example, has moved by less than a predefined amount since the respective last time the reference distance was determined. The reference distance can thus be determined automatically in each case; that is to say, that the calibration signal can be emitted automatically in each case, when the transportation vehicle has moved by at least a predefined amount. Further predefined conditions for the respective emission of the calibration signal, that is to say for the respectively renewed determination of the reference distance, are likewise possible, which are explained further below.

The fact that the condition is pertains to the signal transmitter and/or to operation of the transportation vehicle means that it is not arbitrary, but rather is associated with the signal transmitter, the transportation vehicle and/or the operation or behavior thereof, i.e., is tied thereto. In this regard, as the condition, for example, a specific switching state or process, a function initiation or operating action—performed automatically or manually by the user—of the signal transmitter and/or of the transportation vehicle and/or suchlike can be provided, that is to say used or evaluated. The condition may be met, for example, if a check has been made with a positive result to establish whether a speed of the transportation vehicle has fallen below a predefined threshold value, an engine or an ignition of the transportation vehicle has been switched off or is switched off, a transportation vehicle door of the transportation vehicle has been opened, a button on the signal transmitter has been actuated and/or suchlike.

The present disclosure has the benefit that on account of the automatic calibration an accuracy of the distance determination is improved even if the distance is determined on the basis of the respectively measured field strength of the LF field. This can be carried out automatically and transparently to the user, that is to say without being noticed by the user. The access system or the transportation vehicle can thus be flexibly adapted to different environments, i.e., always have a consistent behavior even in different environments, situations or conditions. The is made possible or achieved without excessively high energy consumption, such as would occur, for example, in the course of permanent use of the second transmitting device operated at a higher frequency and the permanent or exclusive distance determination on the basis of the signal time-of-flight.

The method described can be regarded or referred to as calibrating or calibration of the LF field by the time-of-flight measurement. By virtue of this calibrating, unlike hitherto, the radio-based keyless access system does not have to be adapted to a worst case possible or be parametrized for a corresponding worst case scenario, but rather can achieve a full potential in each case depending on the situation. Overall, the present disclosure can thus ensure that the respective user or customer performs specific transportation vehicle functions or function initiations independently of external influences or conditions at the same distance from the transportation vehicle, that is to say with the same range in each case.

Consequently, it is thus possible to avoid or compensate for the drawback—to be observed depending on the environment or surface underneath—of an overrange of the LF field on account of an influence of different surfaces underneath a transportation vehicle, dynamic parking scenarios and/or structural boundary conditions.

In an exemplary embodiment, a frequency from the SHF band is used for the calibration signal and the response signal. In other words, a frequency from the range of 3 GHz to 30 GHz is used. This enables a precise and secure distance determination. For this purpose, known radio techniques or standards can be used, such as, for example, UWB (ultra wideband), BLUETOOTH®, WiFi, and the like. For determining the reference distance, it is thus possible to have recourse to available technology, as a result of which a particularly cost-effective and reliable realization is likewise made possible, in the same way as multiple use of the second transmitting device for other functions. Specifically, a frequency of 6.6 GHz, for example, can be used.

In a further exemplary embodiment, an LF reference signal with a predefined transmission power is emitted by the first transmitting device and a field strength of the LF reference signal is measured by an LF receiving device arranged on the transportation vehicle at a fixed distance from the first transmitting device. The LF receiving device thus provides a readback channel for the LF reference signal in or on the transportation vehicle. A correction factor is automatically determined from the measured field strength of the LF reference signal, the predefined transmission power and the distance between the first transmitting device and the LF receiving device. The correction factor indicates an environment-dictated deviation of the measured field strength of the LF reference signal with respect to a predefined reference field strength. In this case, the predefined reference field strength is, in particular, that field strength which would be measured for the LF reference signal by the LF receiving device under predefined standard conditions. The reference field strength is thus an expected field strength at the location of the LF receiving device. The correction factor is then likewise taken into account for calibrating the process of determining whether the signal transmitter is situated at most at the predefined distance from the transportation vehicle. In other words, an effect or an influence of a respective current environment, in particular, of a respective current surface underneath, on which the transportation vehicle is situated, on the propagation or distance-dependent attenuation of the LF field is thus measured directly.

By way of example, the LF reference signal can be radiated or emitted in the direction of the surface underneath. The LF reference signal reflected from the surface underneath is then received, that is to say measured, by the LF receiving device. This ensures that a respective influence of the surface underneath is actually taken into account in the measured field strength of the LF reference signal.

In the simplest case, the correction factor can be a number which quantifies, for example, a percentage deviation or damping of the measured field strength relative to the predefined reference field strength. Equally, however, the correction factor can be a family of characteristic curves, a matrix or a function, for example. The correction factor can then indicate, for example, different deviations or damping values for different distances and/or directions. This last may be the case, in particular, if the first transmitting device comprises a plurality of transmitting antennas and/or the LF receiving device comprises a plurality of receiving antennas. Thus, a direction-resolved measurement of the field strength is then possible. The LF reference signal can correspond to the LF field, that is to say can be the LF field, which is emitted anyway. Equally, however, the LF reference signal can be a dedicated signal which, although it can have the same frequency as the LF field, is emitted in a different direction than the LF field only at one or more specific predefined points in time and/or upon a predefined condition—for example, that already mentioned—being met. For this purpose, the first transmitting device can comprise, for example, a dedicated transmitting antenna for emitting the LF reference signal. Additionally or alternatively, a transmitting antenna of the first transmitting device that is used for emitting the LF field can be used for emitting the LF reference signal.

By virtue of the defined, known and fixed, that is to say invariable, relative arrangement of the first transmitting device and the LF receiving device with respect to one another, by way of emitting and receiving the LF reference signal it is possible to establish a relation between the field strength and the range and thus to deduce and ultimately react to the environmental influences that may influence the field strength and/or the range. The signal transmitter likewise has the method or mechanism for measuring the field strength of the LF reference signal, but it is not always reliably situated at an exactly known position or distance with respect to the first transmitting device. Therefore, the field strength of the LF field measured by the signal transmitter cannot be used for the calibration.

The first transmitting device, the LF receiving device and the data or signal processing device mentioned above can form a closed control loop that can be used to modulate the influence of the environment or the surface underneath on the LF field or the latter's propagation or range as manipulated variable. This is possible with particularly little additional energy expenditure since the LF field and respectively the first transmitting device are used. In addition, the predefined transmission power with which the LF reference signal is emitted can be lower than a transmission power used for emitting the LF field, since, for example, only the environment-dictated change and not necessarily the absolute field strength need be measured or taken into account. As an actuator of the control loop, the signal processing device can be used, for example, by virtue of it adapting an evaluation matrix or calculation specification or the like used for determining the distance depending on the measured field strength or the correction factor.

The first transmitting device and the LF receiving device can be arranged, for example, on mutually opposite lateral sills of the transportation vehicle. The first transmitting device and/or the LF receiving device can be embodied in each case as a 1D antenna or 1D coil. This can be realized with particularly little expenditure in respect of material, components and costs. Likewise, the first transmitting device and/or the LF receiving device can be embodied in each case as 3D antennas or comprise in each case at least one 3D antenna, which enables more flexible positioning or arrangement in or on the transportation vehicle without any loss of performance.

In a further exemplary embodiment, for or as the calibrating, i.e., in the course of the calibrating, a predefined threshold value of the field strength of the LF field, the threshold value being assigned to the predefined distance, is dynamically adapted automatically. Then for determining whether the signal transmitter is situated at most at the predefined distance from the transportation vehicle, the measured field strength of the LF field is compared with the adapted threshold value. This process of determining, on the basis of the measured field strength of the LF field, the distance of the signal transmitter by comparing the respectively measured field strength with a predefined threshold value which corresponds or is assigned to the predefined distance can be employed in any embodiment of the disclosed method. In this case, the dynamic adaptation of the threshold value for the calibrating method or mechanism that the assignment or the predefined dependence between the distance and the measured field strength is adapted, that is to say altered, if appropriate.

By way of example, originally or on the part of the manufacturer the signal transmitter can be arranged exactly at the predefined distance and it is possible to measure the field strength of the LF field at this position or at this distance under predefined standard conditions. Accordingly, a value of the field strength measured in this case is then assigned to the predefined distance. This can be carried out once, for example, by the manufacturer prior to delivery of the access system or the transportation vehicle. If, during later use, the transportation vehicle is then situated, for example, in an environment that fosters the propagation of the LF field vis-à-vis the predefined standard conditions, a higher or greater field strength can be measured if and even though the signal transmitter is actually likewise situated at the predefined distance. In such a case, the predefined distance would then be assigned a higher threshold value, which, before this adaptation, would have been interpreted as indicating a smaller distance in comparison with the predefined distance. In this way, the access system can be dynamically adapted, that is to say calibrated, automatically in a particularly simple and arbitrarily repeatable manner. Since only a data-based assignment or evaluation of respective measurement values is thus adapted here, for example, a technically more complex open-loop or closed-loop control or adaptation of the first transmitting device and/or of the transmission power used by the latter for emitting the LF field can be dispensed with.

In a further exemplary embodiment, for or as the calibrating, i.e., in the course of the calibrating, a transmission power of the first transmitting device used for emitting the LF field is dynamically adapted automatically. In the example described above in which the transportation vehicle is situated in the environment that supports the propagation of the LF field, the transmission power of the first transmitting device or of the LF field could then be reduced, therefore. What can then be achieved as a result is that at the predefined distance including in the new environment once again the field strength of the LF field that is expected or measured under the standard conditions is present, that is to say would be measured. The desired consistent behavior of the access system with a reduced energy demand or energy consumption, at least on average, can be realized as a result.

A combination of the stated measures for the calibrating is likewise possible. This may be expedient particularly if a possible scope of adjustment of the transmission power does not suffice to compensate for the respective environmental influence.

In a further exemplary embodiment, as the predefined condition a check is made to ascertain whether the signal transmitter is moving away from the transportation vehicle or is approaching the transportation vehicle. In other words, the calibration signal can thus be emitted if the fact that the signal transmitter is moving away from the transportation vehicle is determined or detected and/or if the fact that the signal transmitter is approaching the transportation vehicle is determined or detected. In such a case, it can be assumed that the transportation vehicle is not in an active traffic situation, i.e., it is expected that the respective environmental conditions will not immediately change. It can then be assumed, therefore, that there is an expectation that use will be made of the functionality of the access system before the transportation vehicle is moved into a different environment. By virtue of the fact that in such a situation the access system is then calibrated as described, the expected, consistent distance-dependent behavior can be set or ensured at least for this next instance of making use of the function. In this case, it is likewise possible to detect and take account of a direction from which the signal transmitter is approaching or in which the signal transmitter is moving away. Given a corresponding direction-resolving or direction-sensitive design of the access system, in particular, of the first transmitting device, the calibrating can then be performed in a direction-dependent manner, that is to say for the respective detected direction of the signal transmitter.

In a further exemplary embodiment, an occurrence of a field strength jump in the field strength of the LF field is used or evaluated as the predefined condition. In other words, the LF field strength—by the signal transmitter and/or by the LF receiving device—is thus measured continuously or regularly and an abrupt or discontinuous change in the field strength is detected. Such a jump in the field strength can occur, for example, at a transition between two different surfaces underneath or types of surface underneath, that is to say in two mutually different environments or environmental conditions that do not merge continuously with one another. Such a jump in the field strength can thus occur if or while the transportation vehicle is moving. This may be the case, for example, during an automatic or remotely controlled, maneuvering process or process of parking or leaving a parking space. In such a case, despite the movement of the transportation vehicle, the signal transmitter can be situated outside the transportation vehicle, for example, such that the determination of the reference distance on the basis of the signal time-of-flight is possible in a particularly accurate and reliable manner. By virtue of the fact that the predefined condition is considered to be met if such a jump in the field strength, for example, in a predefined strength or intensity, is present, that is to say is detected or registered, it is possible always to react to a respective new or changed environment which differs from the respective previous environment at least to a predefined extent with regard to a damping property or a propagation characteristic of the LF field. This makes it possible to ensure that the access system is automatically calibrated in any environment, without this necessitating permanently or continuously emitting the calibration signal and determining the signal time-of-flight thereof. Consequently, a particularly good compromise between an energy demand for the access system, in particular, the calibrating, and an accuracy of the access system or of the distance determination is thus achieved.

In a further exemplary embodiment, as the predefined condition, a time frame is used or evaluated according to which the calibration signal is emitted in each case after a predefined number of determinations of the distance between the signal transmitter and the transportation vehicle, the determinations being based on the measured field strength of the LF field. In other words, as the predefined condition, a check is thus made to ascertain how often the distance between the signal transmitter and the transportation vehicle has been implemented by measurement of the field strength of the LF field since the last time the reference distance was implemented on the basis of the signal time-of-flight of the calibration signal and of the corresponding response signal. If this number corresponds at least to the predefined number, then automatically the calibration signal is emitted and the reference distance is determined. By way of example, upon or after every twentieth distance determination based on the measured field strength of the LF field, the reference distance can be determined on the basis of the signal time-of-flight and the access system can be calibrated. This condition can be checked and monitored particularly simply and without additional measurement complexity. By this method or mechanism, too, a particularly good compromise between the energy demand and the accuracy of the access system is achieved.

A further disclosed embodiment is a radio-based keyless access system for a transportation vehicle, comprising a portable signal transmitter, a first transmitting device for the transportation vehicle for emitting an LF field, a second transmitting device for the transportation vehicle for emitting a calibration signal having a higher frequency in comparison with the LF field, and a data or signal processing device. According to the disclosure, the access system, in particular, the signal processing device, is configured to carry out automatically at least one exemplary embodiment of the disclosed method. The disclosed access system can be the access system mentioned in association with the disclosed method. The access system, in particular, the signal processing device, can comprise a data memory in which is saved or stored a program code which codes or represents the method operations of the disclosed method. Furthermore, the access system, in particular, the signal processing device, can comprise a processor device for executing the program code, the processor device being coupled to the data memory. Furthermore, the disclosed access system can comprise further component parts or components, such as, for example, associated cabling, terminals, connections, housings, interfaces and/or suchlike.

The portable, signal transmitter can be a dedicated device or be integrated into a transportation vehicle key for the transportation vehicle. Likewise, additionally or alternatively, for example, a mobile terminal, such as, for instance, a smartphone, a smart watch, a wearable device, or the like, can be used as the signal transmitter.

A further exemplary embodiment is a transportation vehicle comprising a disclosed radio-based keyless access system. The disclosed transportation vehicle can be the transportation vehicle mentioned in association with the disclosed access system and/or in association with the disclosed method. Accordingly, the disclosed transportation vehicle can likewise have the properties and/or component parts or components described therefor. This can concern, for example, the LF receiving device and/or a receiving device for the response signal.

In a further exemplary embodiment, the disclosed access system or the disclosed transportation vehicle can comprise an environment detecting device. The latter can comprise, for example, at least one camera for detecting an environment of the transportation vehicle, in particular, the surface underneath in the region or the environment of the motor transportation vehicle. An image processing or image recognition system or algorithm can then be provided, which, on the basis of image data of the environment or of the surface underneath that are supplied by the camera, categorizes or classifies the respective environment or the respective surface underneath, that is to say determines or classifies it with regard to its type. Furthermore, an assignment table, a family of characteristic curves or the like can be predefined, which specifies a relationship or an assignment between different environments, surfaces underneath or types of surface underneath and an associated effect on the LF field, in particular, an associated damping or propagation characteristic of the LF field, in the environments and/or on or above the surfaces underneath or types of surface underneath. The respectively identified environment or the respectively identified surface underneath, together with the predefined assignment table or the predefined family of characteristic curves, can then likewise be used or taken into account for the calibrating.

Likewise, on the basis of the identified environment or the identified surface underneath and the predefined assignment table or the predefined family of characteristic curves, the distance determination carried out on the measured field strength of the LF field and/or the distance determination carried out on the basis of the signal time-of-flight and/or the determination of the correction factor can be plausibilized. By a corresponding matching of the respective values measured or determined with the type of surface underneath or the type of environment, a presence of a local special feature can be deduced, for example, in the event of significant deviations or discrepancies. By way of example, the transportation vehicle may be parked on grass, but by chance may be situated right above a metallic object. In such a case, a discrepancy may then occur between the measured damping and the damping expected on the basis of the image data of the surface underneath. By way of example, it may then be assumed that the calibration carried out locally at this respective location may be unreliable, for which reason predefined standard values, for example, can then be used for determining the distance.

The disclosure also includes exemplary embodiments of the access system and of the disclosed transportation vehicle which have features such as have been described in association with the embodiments of the disclosed method, and vice versa. To avoid unnecessary redundancy, the corresponding embodiments are not described again separately here.

An exemplary embodiment is described below. For this purpose, the sole FIGURE shows a schematic overview illustration for elucidating a method for calibrating a radio-based keyless access system of a transportation vehicle.

An exemplary embodiment is explained below. In the exemplary embodiment, the described components of the exemplary embodiment each represent individual features of the disclosure which are to be considered independently of one another and which in each case also develop the disclosure independently of one another and should thus also be regarded as part of the disclosure individually or in a different combination than the one shown. Furthermore, the embodiment described can also be supplemented by further features of the disclosed embodiments from among those that have already been described.

The sole FIGURE shows a schematic overview illustration for elucidating a method for calibrating a radio-based keyless access system of a transportation vehicle 1. In this case, the transportation vehicle 1 comprises a first transmitting device 2 for emitting an LF field 3—indicated schematically here—into an environment of the transportation vehicle 1. Furthermore, the transportation vehicle 1 comprises an LF receiving device 4 for receiving or measuring signals or fields emitted by the first transmitting device 2, in particular, by their field strength. Furthermore, the transportation vehicle 1 comprises a second transmitting device 5 for emitting signals or fields having a higher frequency in comparison with the LF field 3. In the present case here the second transmitting device 5 comprises a receiving device for signals or fields having the higher frequency. Finally, the transportation vehicle 1 comprises a signal processing device 6 and an environment detecting device 14. The signal processing device 6 is connected by corresponding data connections to the first transmitting device 2, the LF receiving device 4, the second transmitting device 5 and the environment detecting device 14, for example, via an on-board electrical system of the transportation vehicle 1.

In the present case, a signal transmitter 7 is illustrated in the environment of the transportation vehicle 1. The signal transmitter 7 is part of the radio-based keyless access system for the transportation vehicle 1. By this access system, at least one predefined function or functionality of the access system or of the transportation vehicle 1 is intended to be initiated automatically as soon as the signal transmitter 7, for example, carried by a user of the transportation vehicle 1, has approached the transportation vehicle 1 up to a predefined distance. For this purpose, therefore, the respective current distance between the signal transmitter 7 and the transportation vehicle 1 must be determined since the respective function or functionality is intended to be provided or initiated only up to the predefined distance, that is to say up to a certain range limit value, and not at greater distances.

In the present case, for this purpose, the signal transmitter 7 measures a field strength of the LF field 3 currently present at its location and communicates a corresponding data signal 8 to the transportation vehicle 1, where the signal is processed further or evaluated by the signal processing device 6. An assumed distance—here corresponding to a position 9—of the signal transmitter 7 is then determined from the data signal 8 and a predefined threshold value indicating a field strength of the LF field 3 assigned to the predefined distance. In this case, therefore, the fact of whether the signal transmitter 7 is situated at most at the predefined distance from the transportation vehicle 1 is determined automatically on the basis of the field strength of the LF field 3 measured by the signal transmitter 7. If this is the case, then the respective function would then accordingly be initiated. Depending on a surface underneath in the environment of the transportation vehicle 1, however, a propagation characteristic or a propagation behavior of the LF field 3 can vary in an unexpected way. This can have the effect that the assumed distance or position 9 of the signal transmitter 7 deviates from the actual distance thereof—here corresponding to an actual position 10.

To counteract this problem, provision is made for the access system, i.e., the process of automatically determining the distance between the signal transmitter 7 and the transportation vehicle 1, to be calibrated automatically on the basis of the measured field strength of the LF field 3. For this purpose, a calibration signal 11 is emitted by the second transmitting device 5 if a predefined condition of the signal transmitter 7 and/or to operation of the transportation vehicle 1 is fulfilled. In response to the calibration signal 11, the signal transmitter 7 communicates a corresponding response signal 12 to the transportation vehicle. The signal processing device 6 then determines automatically a reference distance between the signal transmitter 7 and the transportation vehicle 1 on the basis of the signal time-of-flight between the emission of the calibration signal 11 and reception of the response signal 12 in the transportation vehicle 1. In this case, this distance determination by a second frequency is particularly secure and reliable since in the present case a frequency from the SHF band, for example, 6.6 GHz, is used for the calibration signal 11 and the response signal 12, while the LF field 3 has a frequency of between 100 KHz and 150 KHz, for example.

The process of determining, on the basis of the measured field strength of the LF field 3, whether the signal transmitter 7 is situated at most at the predefined distance from the transportation vehicle 1 is then calibrated automatically by the signal processing device 6 depending on the reference distance determined on the basis of the signal time-of-flight of the calibration signal 11 and of the response signal 12. Thus, by way of a combination of different signals or fields, that is to say by utilizing different properties of different field types or types of field, the LF field 3 is calibrated, or the distance determination is calibrated. It is thereby possible to take into account in each case an influence of the environment of the transportation vehicle 1 on the distance-dependent field strength of the LF field 3 and thus on the distance determination of the signal transmitter 7 that is based thereon. It is thereby possible to avoid having to restrict the access system in all operating states outside a worst case to more of an extent than would be necessary in each case. Overall, it is thus possible to achieve an improvement in a range limit value setting of the access system for situation-dictated influences, without taxing an energy budget of the transportation vehicle 1 and/or of the signal transmitter 7 too much.

For further improvement, in the present case provision is made for an LF reference signal 13 having a predefined transmission power to be emitted by the first transmitting device 2 and to be received by the LF receiving device. In this case, the LF receiving device is arranged at a fixed distance from the first transmitting device 2 on the transportation vehicle 1. A field strength of the LF reference signal 13 measured at the location of the LF receiving device 4 is determined by the LF receiving device 4 or the signal processing device 6. A correction factor is determined therefrom by the signal processing device 6, the correction factor indicating an environment-dictated deviation of the measured field strength of the LF reference signal 13 with respect to a predefined reference field strength. The correction factor is likewise taken into account by the signal processing device 6 for the calibrating.

The environment detecting device 14 can comprise, for example, two cameras for detecting the surface underneath in the environment of the transportation vehicle 1. Image data acquired by the environment detecting device 14 are evaluated automatically by the signal processing device 6 to determine a type of surface underneath in the environment of the transportation vehicle 1. The signal processing device 6 then uses the determined type of surface underneath—for example, concrete, asphalt, grass, soil or the like—and a corresponding assignment table between different types of surface underneath and assigned propagation characteristics of the LF field 3 to plausibilize the distance determination and/or the calibrating.

Overall, the examples described show how an accuracy of a radio-based keyless access system of a transportation vehicle 1 can be improved.

LIST OF REFERENCE SIGNS

1 Transportation vehicle
2 First transmitting device
3 LF field
4 LF receiving device
5 Second transmitting device
6 Signal processing device
7 Signal transmitter
8 Data signal
9 Assumed position (of the signal transmitter 7)
10 Actual position (of the signal transmitter 7)
11 Calibration signal
12 Response signal
13 LF reference signal
14 Environment detecting device.

The invention claimed is:

1. A method for calibrating a radio-based keyless access system of a transportation vehicle, the method comprising:
   emitting an LF field into an environment of the transportation vehicle by a first transmitting device of the transportation vehicle;
   automatically determining, based on a field strength of the LF field measured by a signal transmitter separate from the transportation vehicle, whether the signal transmitter is situated within a predefined distance from the transportation vehicle;
   emitting a calibration signal having a higher frequency relative to the LF field by a second transmitting device of the transportation vehicle in response to a predefined condition of the signal transmitter and/or to operation of the transportation vehicle being fulfilled by, which the signal transmitter responds to by transmitting back a response signal having a higher frequency relative to the LF field;
   automatically determining a reference distance between the signal transmitter and the transportation vehicle based on a signal time-of-flight between the emission of the calibration signal and reception of the response signal by the transportation vehicle; and
   automatically calibrating the process of determining, whether the signal transmitter is situated within the predefined distance from the transportation vehicle based on the reference distance determined based on the signal time-of-flight.

2. The method of claim 1, wherein an SHF band frequency is used for the calibration signal and the response signal.

3. The method of claim 1, further comprising:
   emitting an LF reference signal with a predefined transmission power by the first transmitting device;
   measuring a field strength of the LF reference signal by an LF receiving device arranged on the transportation vehicle at a fixed distance from the first transmitting device; and
   determining a correction factor based on the measured field strength of the LF reference signal, the predefined transmission power and the distance between the first transmitting device and the LF receiving device, the correction factor indicating an environment-dictated deviation of the measured field strength of the LF reference signal with respect to a predefined reference field strength, wherein the correction factor is taken into account for calibrating the process of determining whether the signal transmitter is situated within the predefined distance from the transportation vehicle.

4. The method of claim 1, wherein, for the calibrating, a threshold value of the field strength of the LF field, the threshold value being assigned to the predefined distance, is dynamically adapted automatically, and wherein, for determining whether the signal transmitter is situated within the predefined distance from the transportation vehicle, the measured field strength of the LF field is compared with the adapted threshold value.

5. The method of claim 1, wherein, for the calibrating, a transmission power of the first transmitting device used for emitting the LF field is dynamically adapted automatically.

6. The method of claim 1, wherein, as the predefined condition, a check is made to ascertain whether the signal transmitter is moving away from the transportation vehicle or is approaching the transportation vehicle.

7. The method of claim 1, wherein an occurrence of a field strength jump in the field strength of the LF field is used as the predefined condition.

8. The method of claim 1, wherein, as the predefined condition, use is made of a time frame according to which the calibration signal is emitted in each case after a predefined number of determinations of the distance between the signal transmitter and the transportation vehicle, the determinations being based on the measured field strength of the LF field.

9. A radio-based keyless access system for a transportation vehicle, the system comprising:
a portable signal transmitter;
a first transmitting device for the transportation vehicle for emitting an LF field;
a second transmitting device for the transportation vehicle for emitting a calibration signal having a higher frequency relative to the LF field; and
a signal processing device,
wherein the access system is configured to automatically carry out a method for calibrating a radio-based keyless access system of the transportation vehicle,
wherein the first transmitting device emits the LF field into an environment of the transportation vehicle,
wherein based on a field strength of the LF field measured by a signal transmitter separate from the transportation vehicle, a determination is made whether the signal transmitter is situated within a predefined distance from the transportation vehicle;
wherein the calibration signal having the higher frequency relative to the LF field is emitted by the second transmitting device in response to a predefined condition of the signal transmitter and/or to operation of the transportation vehicle being fulfilled,
wherein the signal transmitter responds to the calibration signal by transmitting back a response signal having a higher frequency relative to the LF field,
wherein a reference distance between the signal transmitter and the transportation vehicle is determined automatically based on a signal time-of-flight between the emission of the calibration signal and reception of the response signal by the transportation vehicle, and
wherein the process of determining whether the signal transmitter is situated within the predefined distance from the transportation vehicle is calibrated automatically based on the reference distance determined based on the signal time-of-flight.

10. A transportation vehicle comprising the radio-based keyless access system of claim 9.

11. The system of claim 9, wherein an SHF band frequency is used for the calibration signal and the response signal.

12. The system of claim 9, wherein an LF reference signal with a predefined transmission power is emitted by the first transmitting device,
a field strength of the LF reference signal is measured by an LF receiving device arranged on the transportation vehicle at a fixed distance from the first transmitting device,
a correction factor is determined based on the measured field strength of the LF reference signal, the predefined transmission power and the distance between the first transmitting device and the LF receiving device, the correction factor indicating an environment-dictated deviation of the measured field strength of the LF reference signal with respect to a predefined reference field strength, and
the correction factor is taken into account for calibrating the process of determining whether the signal transmitter is situated within the predefined distance from the transportation vehicle.

13. The system of claim 9, wherein, for the calibrating, a threshold value of the field strength of the LF field, the threshold value being assigned to the predefined distance, is dynamically adapted automatically, and
wherein, for determining whether the signal transmitter is situated within the predefined distance from the transportation vehicle, the measured field strength of the LF field is compared with the adapted threshold value.

14. The system of claim 9, wherein, for the calibrating, a transmission power of the first transmitting device used for emitting the LF field is dynamically adapted automatically.

15. The system of claim 9, wherein, as the predefined condition, a check is made to ascertain whether the signal transmitter is moving away from the transportation vehicle or is approaching the transportation vehicle.

16. The system of claim 9, wherein an occurrence of a field strength jump in the field strength of the LF field is used as the predefined condition.

17. The system of claim 9, wherein, as the predefined condition, use is made of a time frame according to which the calibration signal is emitted in each case after a predefined number of determinations of the distance between the signal transmitter and the transportation vehicle, the determinations being based on the measured field strength of the LF field.

* * * * *